United States Patent
Purkayastha et al.

(10) Patent No.: US 8,134,978 B2
(45) Date of Patent: Mar. 13, 2012

(54) INTEGRATION OF 802.21 MEDIA INDEPENDENT HANDOVER FUNCTIONALITY TO RADIO INTERFACE LAYER AND TELEPHONY SERVER

(75) Inventors: Debashish Purkayastha, Pottstown, PA (US); Michelle Perras, Montreal (CA); Shamim Akbar Rahman, Montreal (CA); Ulises Olvera-Hernandez, Kirkland (CA); Alan G. Carlton, Mineola, NY (US); Samian Kaur, Conshohocken, PA (US)

(73) Assignees: InterDigital Technology Corporation, Wilmington, DE (US); SK Telecom Company, Ltd., Seoul (KR)

( * ) Notice: Subject to any disclaimer, the term of this patent is extended or adjusted under 35 U.S.C. 154(b) by 650 days.

(21) Appl. No.: 12/259,546

(22) Filed: Oct. 28, 2008

(65) Prior Publication Data
US 2009/0201879 A1    Aug. 13, 2009

Related U.S. Application Data

(60) Provisional application No. 60/983,435, filed on Oct. 29, 2007.

(51) Int. Cl.
*H04W 4/00* (2009.01)
*H04W 36/00* (2009.01)

(52) U.S. Cl. .......................... 370/332; 370/331; 455/437

(58) Field of Classification Search .................. 370/331, 370/332; 455/436–438
See application file for complete search history.

(56) References Cited

U.S. PATENT DOCUMENTS

| | | | |
|---|---|---|---|
| 6,826,762 B2 | 11/2004 | Shell et al. | |
| 7,162,408 B2* | 1/2007 | Kashyap et al. | 703/24 |
| 7,483,984 B1 | 1/2009 | Jonker et al. | |
| 7,496,084 B2 | 2/2009 | Inoue et al. | |
| 2006/0140150 A1 | 6/2006 | Olvera-Hernandez et al. | |
| 2006/0187882 A1* | 8/2006 | Kwak et al. | 370/331 |
| 2006/0222009 A1 | 10/2006 | Yao et al. | |
| 2006/0223522 A1 | 10/2006 | Guo et al. | |
| 2006/0225082 A1 | 10/2006 | Yao et al. | |
| 2006/0258355 A1 | 11/2006 | Olvera-Hernandez et al. | |
| 2007/0173283 A1 | 7/2007 | Livet et al. | |
| 2008/0198804 A1 | 8/2008 | Rahman et al. | |

OTHER PUBLICATIONS

LAN MAN Standard Committee of the IEEE Computer Society, "Draft Standard for Local and Metropolitan Area Networks: Media Independent Handover Services", IEEE P802.21/D05.01, (May 2007).

LAN MAN Standards Committee of the IEEE Computer Society, "Draft Standard for Local and Metropolitan Area Networks: Media Independent Handover Services", IEEE P802.21/D10.0, (Apr. 2008).

LAN MAN Standard Committee of the IEEE Computer Society, "Draft Standard for Local and Metropolitan Area Networks: Media Independent Handover Services", IEEE P802.21/D05.01, (May 2007).

LAN MAN Standards Committee of the IEEE Computer Society, "Draft Standard for Local and Metropolitan Area Networks: Media Independent Handover Services", IEEE P802.21/D10.0, (Apr. 2008).

* cited by examiner

*Primary Examiner* — Ricky Ngo
*Assistant Examiner* — Paul Masur
(74) *Attorney, Agent, or Firm* — Volpe and Koenig, P.C.

(57) ABSTRACT

A radio interface layer media independent handover (RIL MIH) client functionality enables transparent inter-system handover of a wireless transmit/receive unit (WTRU) between different radio access technologies (RATs), without user intervention. The RIL MIH client interacts with RIL drivers and proxies, informs the RIL proxies of the handover status, then the proxies interact with a new driver in use. A WTRU is modified to add MIH functionality to a telephony server to support inter-system handover.

16 Claims, 7 Drawing Sheets

INTEGRATION OF 802.21 MEDIA INDEPENDENT HANDOVER FUNCTIONALITY TO RADIO INTERFACE LAYER AND TELEPHONY SERVER

CROSS REFERENCE TO RELATED APPLICATIONS

This application claims the benefit of U.S. Provisional application 60/983,435 filed on Oct. 29, 2007 which is herein incorporated by reference.

TECHNOLOGY FIELD

This application is related to wireless communications.

BACKGROUND

The IEEE 802.21 standard provides a uniform set of functionalities that help enable and enhance handovers across different link layer technologies. In particular, IEEE 802.21 defines a media independent handover (MIH) client which resides in communications entities of several wireless systems capable of supporting inter-system handover.

At a high level, the enhanced handover capability involves an upper layer MIH user which can communicate with a MIH client, either locally or remotely, over a transport medium. The MIH client, in turn, interacts with link-layer devices. An 802.21 MIH client is disclosed in U.S. patent application Ser. No. 11/862,963, filed on Sep. 27, 2007.

The purpose of the 802.21 MIH client is to allow efficient software implementation of handover between different technologies (e.g. wireless broadband (WiBro) to universal mobile telecommunications system (UMTS)). The MIH client also enables automatic inter-technology mobility, both at Layer 2 and Layer 3, reduces handover interruption time, and provides quality of service (QoS) optimization across technologies.

FIG. 1 is a block diagram of an example 802.21 MIH client architecture for performing a handover from a WiBro network to a wideband code division multiple access (WCDMA) network. A wireless transmit/receive unit (WTRU) 100 may include an IEEE 802.21 (e.g., WiBro, worldwide interoperability for microwave access (WiMAX) or the like) modem 110, a WDCMA modem 120, an MIH client (MIH middleware) 130, and an upper layer 140. The WTRU 100 may also include one or more other components that are not illustrated in FIG. 1 for purposes of clarity. The upper layer 140 may include an application layer 150, (such as instant message, web browsing, or the like), a control protocol layer 160 (that includes modules such as a session initiation protocol (SIP) client 162, a Mobile Internet protocol (MIP) client 164, a dynamic host configuration protocol (DHCP)/domain name system (DNS) module 166, or the like), a transport layer 170, (such as a user datagram protocol (UDP) layer, a transmission control protocol (TCP) layer, a stream control transmission protocol (SCTP), a datagram congestion control protocol (DCCP), or the like), an IP layer 180, and an operating and maintenance (O&M) entity 190. The WiBro modem may include a WiBro physical layer 112 and a WiBro medium access layer (MAC) 114. The WCDMA modem may include a physical layer 122, an access stratum (AS) layer 124, and a non-access stratum (NAS) layer 126. The commands and information from the MIH client 130 to the WiBro modem 110 and the WCDMA modem 120, or vice versa, may be communicated via 802.21 service access points (SAPs) 118, 128 that perform mapping functions for the WiBro modem 110 and the WCDMA modem 120.

For example, a method for implementing software interfaces between the MIH client 130 and other entities in the WTRU 100 is provided. The software interfaces provide the MIH client 130 with mechanisms to receive information about the WiBro and WCDMA links, control the WiBro modem 110, the WCDMA modem 120 and other components of the WTRU 100 for inter-technology handover, discover an MIH server and IP multimedia system (IMS) network nodes through DHCP or domain name system (DNS), trigger Mobile IP to perform IP handover, send or receive MIH messages over TCP/UDP, and allow the O&M entity 190 to be able to control the MIH entity 130.

The radio interface layer (RIL) concept is disclosed in Microsoft Corporation U.S. Pat. No. 6,826,762, dated Nov. 30, 2004. A RIL is used to provide access to cellular functionality for any component in a wireless device (e.g., a phone, personal digital assistant (PDA), etc.). The RIL is an application program interface (API) set providing a level of abstraction between the radio on a cell phone and the software of the wireless device. Without the RIL, each component would have to understand how to communicate to the radio directly. The RIL was created to reside between the radio and the applications running on the wireless device.

FIG. 2 shows a RIL architecture. The RIL is composed of the following: multiple instances of RIL Proxy 235 that are hardware-independent, and one RIL Driver 240 that is hardware-specific. As shown in FIG. 2, the RIL architecture may also include a Subscriber Identity Module (SIM) module 205, an emergency module 210, a StingTSP module 215, a Wireless Application Protocol (WAP) module 220, a short message service (SMS) module 225, a data stack module 230, a Virtual Serial Port (VSP) module 250, and radio hardware 245.

Symbian and Linux application frameworks, such as Qtopia, Android and LIMO for example, use a telephony server to interface with communication devices like a cellular modem, wireless local area network (WLAN), WiMax etc. The telephony server establishes the network connections as requested by a user and maintains the connection. Otherwise, connections are set up based on static configurations.

Mobile devices often include more than one communication module and are able to setup simultaneous connections. MIH technology ideally fits in this application framework and improves the user experience by providing seamless handover across various radio access technologies.

FIG. 3 is an example block diagram showing the architecture of the telephony application framework 300. The telephony server 310 is responsible for handling circuit switched calls over a cellular modem or voice over internet protocol (VoIP). The network stack 320 is responsible for handling packet switched sessions over various network technologies, such as 2.5 G, 3 G, WLAN, etc.

The telephony server 310 is functionally split into three main functions. These functions are the user interface and APIs to applications, the call processing functions for various call types, e.g. global system for mobile communication (GSM), VoIP, etc., and the device management functions. Each function will now be discussed in turn.

The user interface (UI) functional block 330 provides an API, for example for Qtopia applications, and a graphical user interface (GUI) to obtain access to the telephony server. Examples of Qtopia applications include a phone dialer and a SMS/MMS client, etc.

This functionality is generally implemented using a UI widget. A UI widget is an object used to hold data and present an interface to the user. A UI widget is a combination of state and procedure. The UI widget maintains state information about different applications. This is what allows a user to navigate across various screens such as an active voice call session, a SMS session and a browser session running in parallel. The UI widget runs as a server and is brought up during the system startup phase and is always available to accept telephony requests from applications. The UI widget uses the call processing module API to initiate a new call, disconnect a call, etc.

The call processing module 340 accepts requests for a new call, requests to send a SMS/MMS from the UI widget, and provides indications about the call such as ringing, call accepted, etc. to the UI widget.

The call processing module 340 uses the services provided by device management module 350 to dial a call, send SMS etc. It uses the indications provided by device management module 350 such as call state, device state, arrival of a new message, etc. to support call processing functions.

The call processing module 340 consists of three main functional components. These components are the policy manager 360, the call handlers 370 for different call types, e.g. GSM, VoIP, etc., and general indications and services 380, such as subscriber identity module (SIM) access, phone book update, etc.

The policy manager 360 and call handler function 370 service only voice and circuit switched data (CSD) calls. The policy manager determines the call handler, such as GSM handler or VoIP handler, to be used to handle voice or CSD calls. The UI widget sends call requests to the policy manager and specifies the call type. Based on the call type, the policy manager decides which call handler to use for servicing the call request. The policy manager maintains a list of call handlers during system startup and initialization.

The call handler accepts call requests, such as create a new call from the policy manager. It directly notifies the UI widget about the call state. Call handlers handle each call separately and maintain the call state. It also maintains the state of the device. The call handlers use the service provided by the device management module to complete the call request. For example, it may request to dial a number if allowed by the call state machine. The call handler receives indications related to call state, such as waiting for an answer, modem is ready, or arrival of a new incoming call from the device management module. The call handler uses these indications to update an existing call state machine or create a new call state machine.

Other services, such as short message service (SMS), multimedia messaging service (MMS), contact and phone book update are handled by the general indications and services functional block 340. The general indications and services functional block 340 is responsible for accepting requests from the UI widget for services such as sending SMS, performing a phone book update, accessing a SIM, etc. After processing these requests, indications about the state are sent to the UI widget. Other autonomous indications, such as signal strength and battery power, are collected by this module and forwarded to the UI. The general indications and services function 340 uses the device management function to implement the services such as sending SMS, reading SMS, and updating the SIM phone book. It receives indications about the signal strength and battery power from the device management module 350.

The device management module 350 provides access to the device for functions such as dialing numbers, checking network registration, collect signal strength, etc. It maintains the device state based on the requests and the response. This state information is sent to the call processing module 340 to update the call state machine. The device management module 350 consists of two main functions, namely the phone server 352 and the device services (which include, e.g., a modem service provider 354 and a VOIP service provider 356).

The phone server 352 is the main interface to the device management module 350. All service requests from call processing modules go through the phone server 352. During device initialization, the phone server 352 starts up all services. The services that are started successfully are maintained by the phone server 352. The phone server 352 uses this information to dispatch requests to the proper device service 354, 356.

The device services are a collection of independent actions performed on a device. For example, modem service consists of tasks like call handling, pin management, network registration, SIM phone book access and indication handler like signal strength, battery power, etc. for the cellular modem. These services work synchronously with the client functions in the call processing module 340. The phone server dispatches the service request from call processing modules 340 to device services 350. The call processing modules 340 and general indications and services functions 380 receives notification about the state of the call and indications such as new call, new SMS etc. The device service 350 interfaces with the actual device through device driver interface or special mechanisms such as attention (AT) command interface for cellular modems.

The network stack 320 is responsible for managing data sessions to support data applications like MMS, browser, etc. over data links such as 2.5 G, 3 G, WiMax or WLAN. Most data applications use session layer protocols 325 such as hypertext transport protocol (HTTP), session initiation protocol (SIP), and Mobile IP (MIP). These protocols are part of the network stack and follow standard implementation. These protocols use sockets and transmission control protocol/user datagram protocol (TCP/UDP) for transport. The socket service 335 is provided by the operating system (OS). The data link layer connection is managed by the network management module 345. Once the network management function sets up the data link layer, sockets can use it for data transport.

The network management module 345, is responsible for powering up and activating devices, registering with the network etc. It maintains the current state of a network interface. It is very similar to a connection manager functionality for static handling of Layer 2 connections and consists of the network server 346, the device manager 347, and the network manager 348. A Layer 2 connection is a combination of a device manager entity and a network manager entity. A device may be combined with one or more network entity. This combination is defined as network interface. The combinations are static and pre-configured.

The network server 346 provides functions for starting/stopping of network interfaces. It allows managing of existing network configurations. This is useful because applications can influence the connectivity state of a network interface. The network server synchronizes network interface operations across all applications. The client applications request network operations via the network server. The network server 346 will choose and load the appropriate network plug-in (software component specific to the device and network operation) based on the configuration handle (pointer to configuration parameter and configuration script). The client applications are notified about the network interface state.

The device manager 347 consists of device entities which are Layer 2 function wrappers such as point to point protocol (PPP) wrapper, and WLAN interface wrapper, etc., which provide a complete interface package with the application framework. The device manager manages the connectivity state of the device like on, off, transferring data, idle etc. The device manager is always associated with a configuration file which serves as an identifier/handle for a particular device. The network server 346 uses the configuration handle provided by the device entity to load a plug-in. The information about the device state is used to handle network interface requests.

The network manager 348 consists of various network entities which are wrapper functions to obtain network information and monitoring of network connection, for e.g. if the device is camped and registered with a GPRS network, available WLAN networks, etc. The network manager 348 provides this information to network server 346 to handle network interface requests.

The RIL and the telephony server described above lack the capability to support inter-system handover across different radio access technologies. As various communication networks and devices are becoming common in a phone platform, this feature is becoming necessary for multi-mode devices. Therefore adding 802.21 MIH functionality to a RIL or a telephony server would be desirable to allow an apparatus, such as a PC, laptop, cell phone, etc., to support inter-system handover across different radio access technologies.

SUMMARY

A Media Independent Handover (MIH) 802.21 client may be used to include functionality for a Radio Interface Layer (RIL) and a telephony server, which allows seamless inter-system handover across different radio access technologies. A wireless transmit/receive unit (WTRU) may be modified to include a radio interface layer (RIL) configured to support inter-system handover. As an example, the modified RIL may include at least two RIL proxies, where each RIL proxy is configured to implement RIL application functions, a RIL media independent handover (RIL MIH) client, a first radio access technology (RAT) RIL driver configured to send radio link status indications to the RIL MIH client, and to communicate directly with one of the at least two RIL proxies during an active first RAT call, and a second RAT RIL driver configured to send radio link status indications to the RIL MIH client, and to communicate directly with one of the at least two RIL proxies during an active second RAT call. Upon receiving radio link status indications from the first RAT RIL and second RAT RIL drivers, the RIL MIH client triggers a radio level handover in order to establish a new radio link, triggers an internet protocol (IP) level handover when the new radio link is ready for use, and communicates to the at least two RIL proxies that the new radio link is ready for use in response to a completed IP handover.

A WTRU may be modified to include a telephony server configured to support inter-system handover. An example of a modified telephony server may include a media independent handover (MIH) client, a first radio of a first type of RAT including device drivers configured to send link status information to the MIH client, a second radio of a second type of RAT including device drivers configured to send link status information to the MIH client, a call processing module, a device management module configured to communicate with the call processing module and the first radio during an active call on the first RAT type and the second radio during an active call on the second RAT type, a network management module configured to communicate with the MIH client and the first and second radios, and a layer 3 protocol module including a mobile internet protocol (MIP) and a session initiation protocol (SIP) configured to communicate with the network management module, the MIH client and a socket layer. Upon receiving link status indications from the first and second RAT device drivers, the MIH client triggers a radio level handover in order to establish a new radio link, establishes an internet protocol (IP) and a point-to-point (PPP) connection using the new radio link, triggers a handover of an active MIP session, and communicates to the call processing module that the new radio link is ready for use in response to a completed MIP handover.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
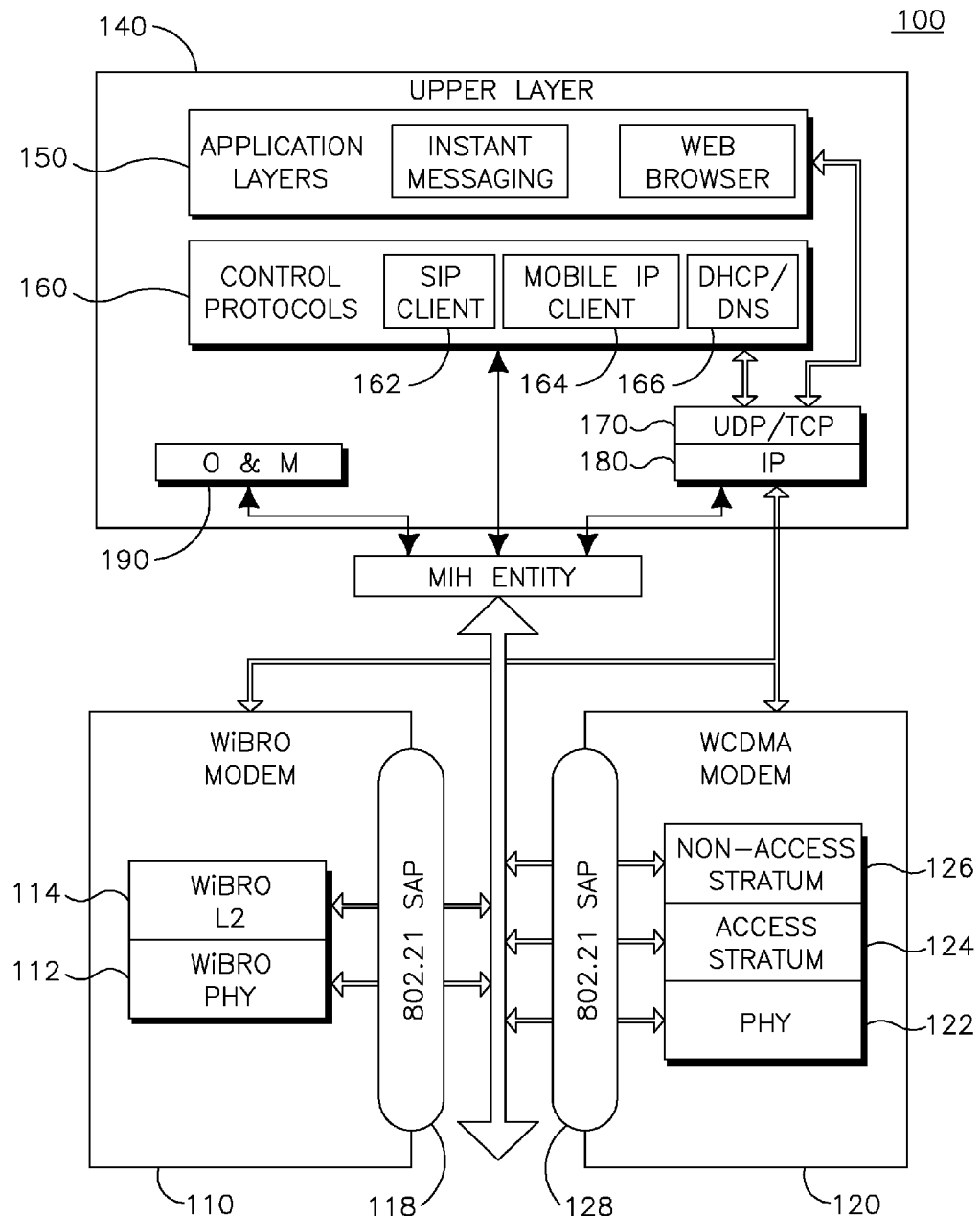
FIG. 1 is a block diagram of an 802.21 MIH client implementation.
Figure 2:
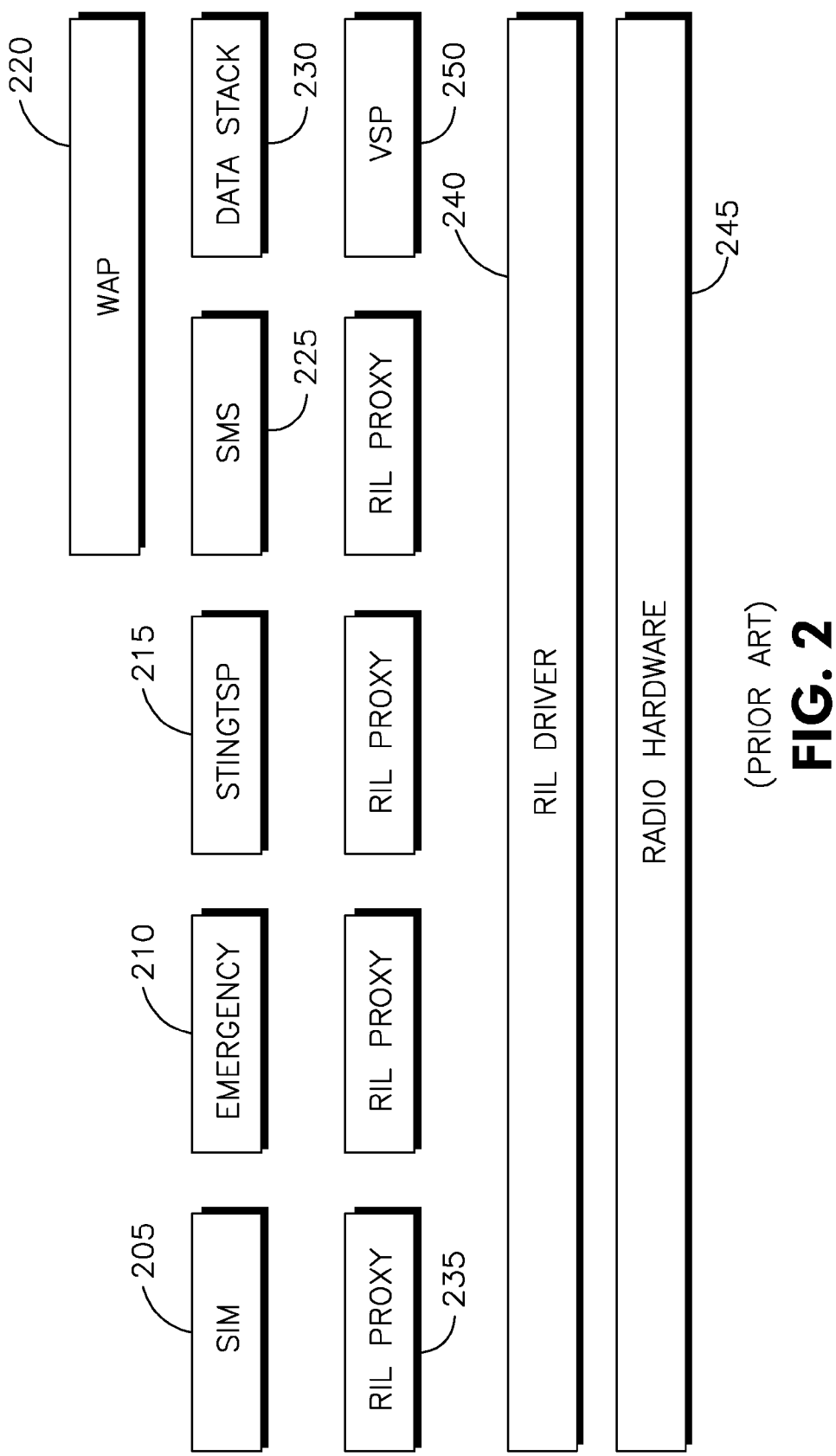
FIG. 2 is a block diagram of a RIL architecture.
Figure 3:
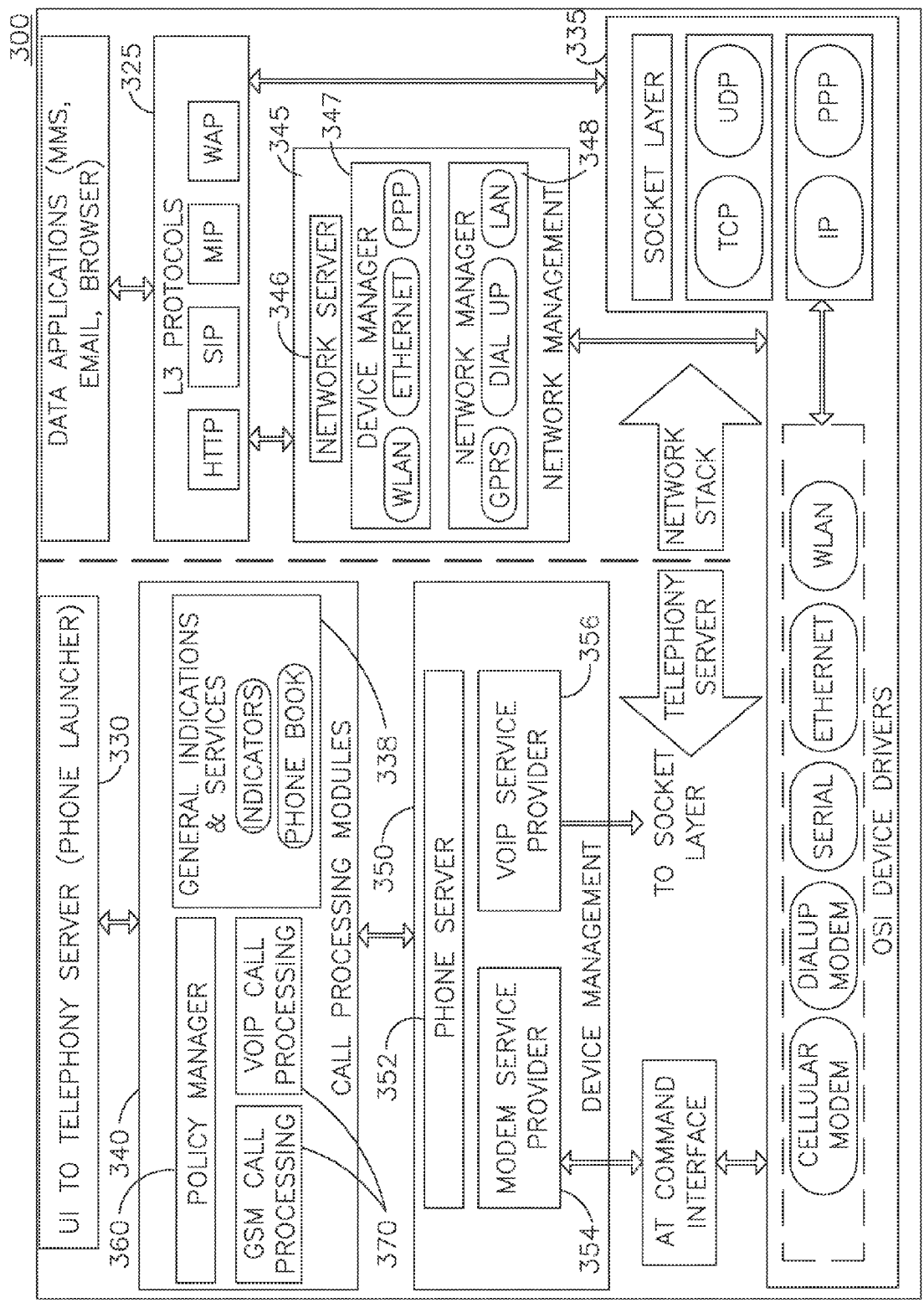
FIG. 3 is an example block diagram showing a telephony architecture.
Figure 4:
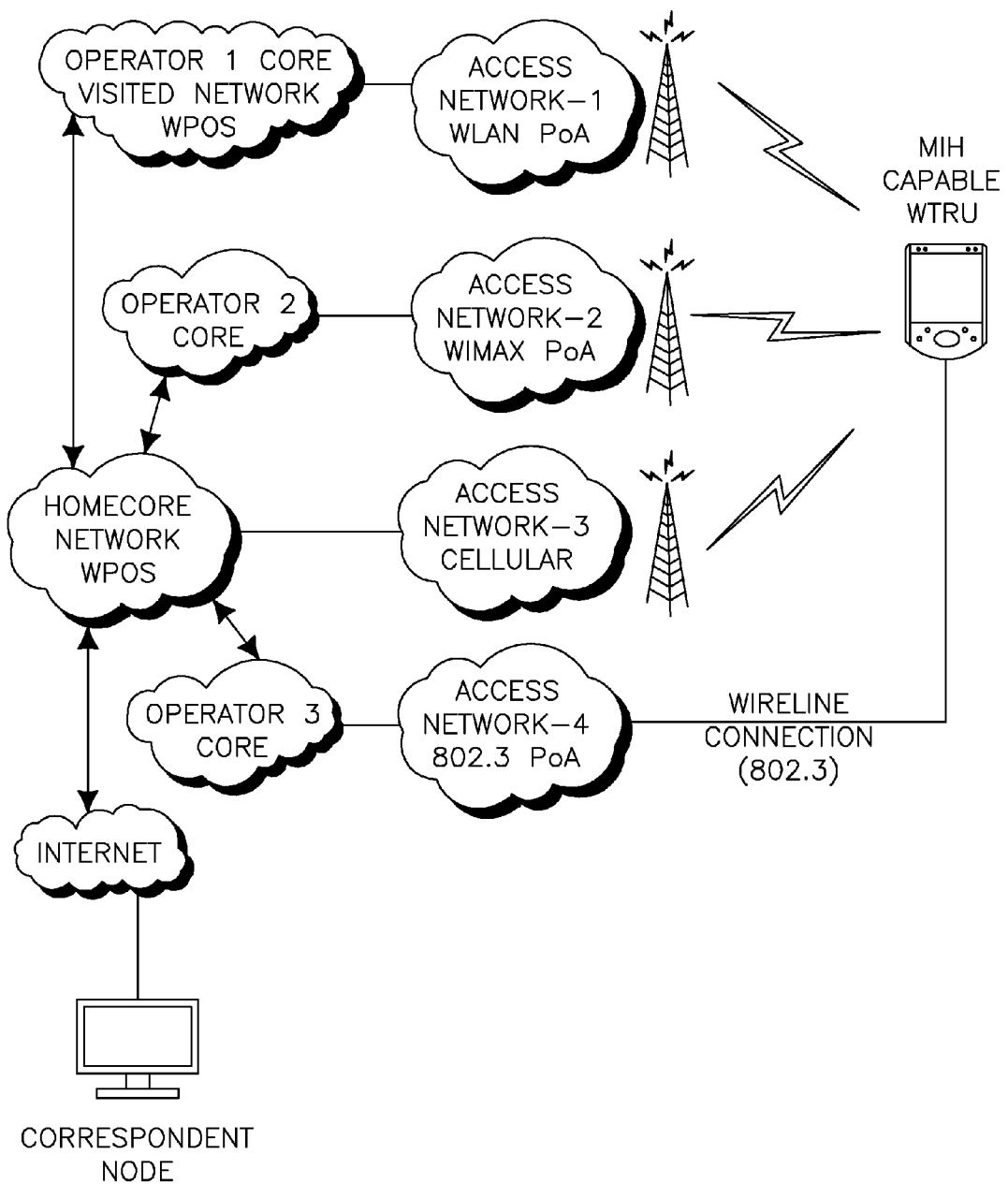
FIG. 4 is an example network architecture for wireless systems capable of supporting inter-system handover.

FIG. 4 shows an example of network architecture for wireless systems capable of supporting inter-system handover. These underlying technologies may include for example Third Generation Partnership Project (3GPP), 3GPP2 and IEEE-based networks such as IEEE 802.xx, code division multiple access (CDMA) 2000; universal mobile telephone system (UMTS), GSM, long term evolution (LTE) or any other wireless communication system including future wireless communication systems not yet developed.

Figure 5:
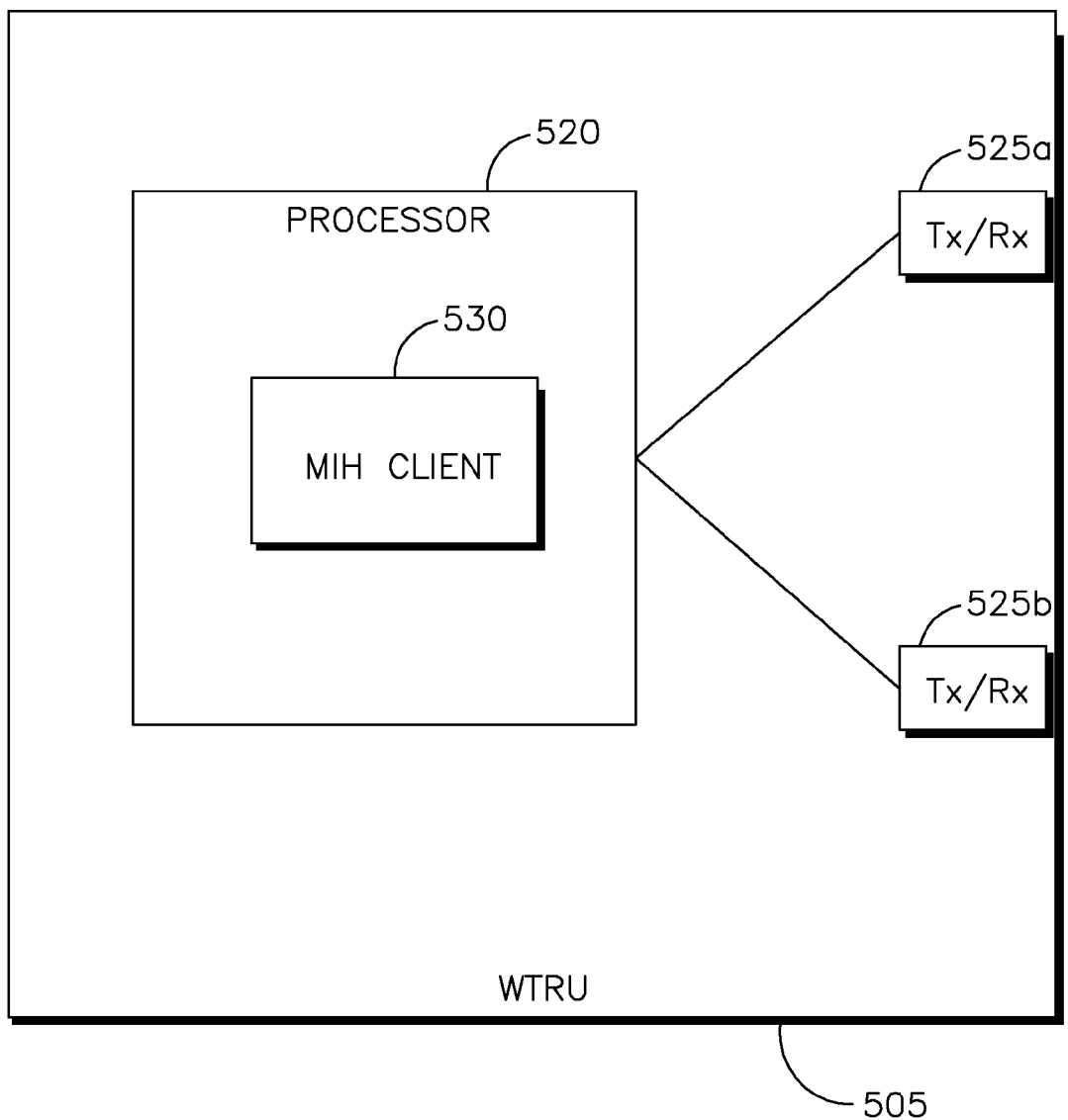
FIG. 5 is an example block diagram of a wireless transmit receive unit configured to perform media independent handover.

FIG. 5 is an example block diagram of a wireless transmit receive unit (WTRU) 505 configured to perform a media independent handover. As shown in FIG. 5, the WTRU 505 includes a processor 520 and at least one transceiver (525a, 525b). The processor 520 is configured to run an MIH client 530, and is attached to each of the transceivers 525a, 525b. The MIH client 530 is configured to carry out media independent handover related processes, including receiving a link status from a device driver, receiving a measurement of link quality, generating and collecting quality reports, sending the quality reports to the MIH server (not shown) over the MIH message transport interface using the socket layer, and receiving a decision to perform a handover from the MIH server.

Figure 6:
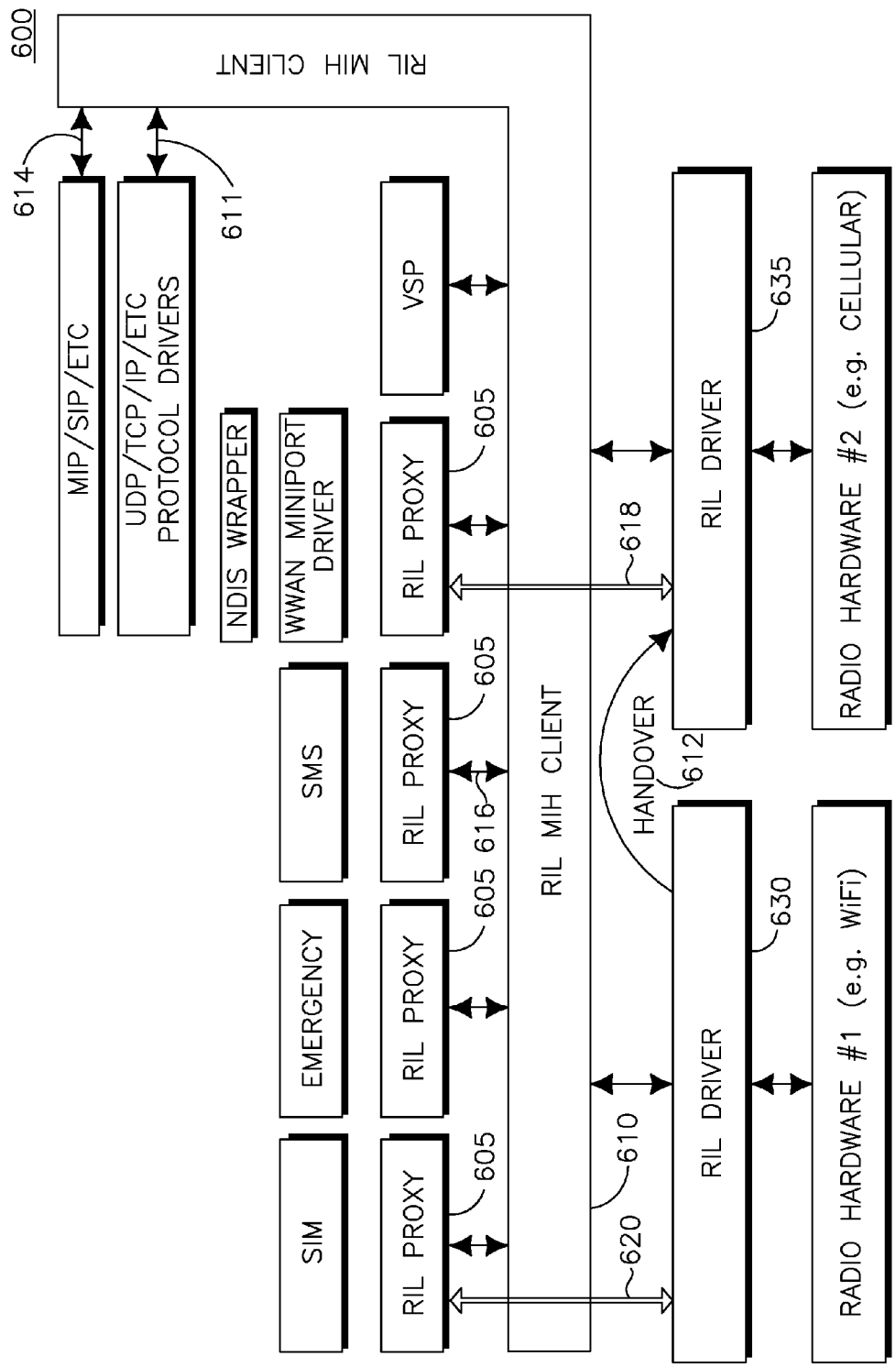
FIG. 6 is an example block diagram that shows how a MIH client can be added to a RIL.

FIG. 6 is an example block diagram that shows how a MIH client can be added to a RIL 600. Adding 802.21 MIH functionality to a RIL allows a WTRU (e.g., a PC, laptop, cell phone, etc.) to support seamless inter-system handover across multiple radio technologies. This new functionality will be referred to as the RIL MIH client. The RIL MIH client may be part of the Radio Interface Layer. The RIL MIH client may interact with all RIL drivers and proxies. The RIL MIH client may handle the handover between two (or more) radios and the IP level handover.

The handover may be either network-controlled (input from the network); or client-controlled (input parameters from the SIM, other software (SW) components, etc.). The RIL MIH client may inform the RIL Proxies of the handover status. The proxies may then interact with the new driver in use.

Referring to FIG. 6, the proxies 605 of the RIL MIH client 610 interact with a current active driver prior to a handover 620. A plurality of RIL drivers 630, 635 send radio link status indications (e.g., signal strength) to a RIL MIH client 610. When the RIL MIH client 610 receives a handover request from an external server after sending a received link status for a network controlled mode 611, the RIL MIH client 610 triggers a radio handover. The request from a server may be for a network-controlled mode or an independent client-controlled mode 612 handover. Handover at an internet protocol level may be triggered by the RIL MIH client when the new radio link is established 614. The RIL MIH client 610 informs proxies 605 of the RIL as to when the new radio is ready to be used after a mobile internet protocol handover is completed 616. The RIL proxies 605 are configured to communicate with the RIL driver 630 that interfaces with a newly active radio link 618.

The RIL MIH client 610 may be provided as a Dynamic-Link Library (DLL). A set of functions may be exposed to the RIL components, for example, the MIH client may be called by the RIL driver using a mihc_link_status_indication (signal measurement, assigned identifier) message or the MIH client may be called by the RIL proxies using a mihc_register_request (callback functions, assigned identifier) message. The RIL MIH client 610 runs in the process space of the RIL proxy. The RIL MIH client 610 may be configured to be hardware independent.

The following is an example of a WTRU configured to perform a handover from a WiBro network to a cellular network. The RIL 600 of the WTRU includes a RIL MIH client 610, a WiBro RIL driver 630, a cellular RIL driver 635, an upper layer protocol stack, and at least two RIL proxies 605 configured to implement RIL application functions. The WiBro RIL driver 630 is configured to send radio link status indications to the RIL MIH 610 client and communicates directly with at least one of the RIL proxies 605 during an active WiBro call. The cellular driver 635 is configured to send radio link status indications to the RIL MIH client 610 and communicates directly with at least one of the RIL proxies 605 during an active cellular call. The RIL MIH client 610 receives the radio link status indications from the WiBro RIL driver 630 and the cellular RIL driver 635 and triggers a radio level handover in order to establish a new radio link. The RIL MIH client 605 then triggers an IP level handover when the new radio link is ready for use and notifies the RIL proxies 605 that the new radio link is ready for use upon completion of the handover.

When multiple RIL components are configured to register with the RIL MIH client 610, a unique identifier is assigned to each registered component. Registering components may provide callback functions. For example, the RIL proxies register with the RIL MIH by calling RIL MIH functions exposed to all modules using a predefined function name. In this example, the RIL proxies would provide pointers to their provided functions, known as callback functions. The RIL MIH uses the function pointers to interact with the RIL proxies since the RIL proxies do not directly expose their provided functions. In this example, the RIL MIH functions independently by exposing its functions and using callbacks to interact with other modules.

Only RIL proxies and drivers 630 are impacted by the introduction of the RIL MIH client 610, which is transparent to all applications. The RIL proxies and drivers 630 call the RIL MIH client 610 exported functions, link with the RIL MIH client DLL, and register with the RIL MIH client 610. In addition, the callback functions may also be registered.

When the RIL proxies and drivers 630 are configured to implement the required RIL MIH API functions (provided as callback functions), the RIL drivers 630 provide link status indications and receive commands from the RIL MIH client 610. The RIL proxies 605 then receive handover indications from the RIL MIH client 610.

In summary, the RIL MIH client 610 provides benefits such as enabling transparent handover between the radios with no user intervention, and handling the handover using only the RIL MIH client 610.

The following describes how MIH functionality may be added in the Symbian and Linux telephony server, the architectural changes required and any new interfaces that may require development.

Figure 7:
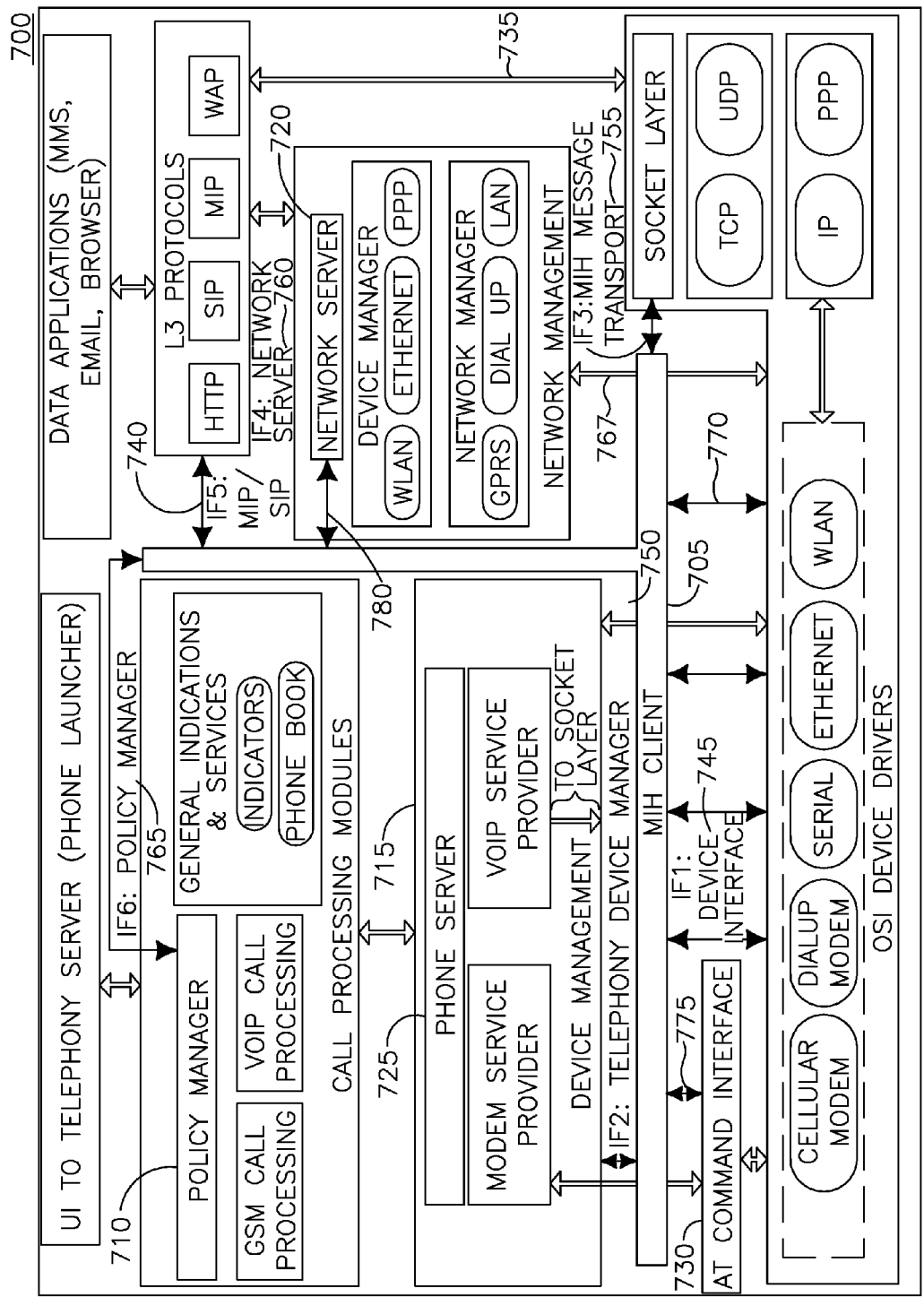
FIG. 7 is an example block diagram that shows how a MIH client can be added to a telephony server.

FIG. 7 is an example block diagram that shows how the MIH client may be added into a typical telephony server 700, as previously described. It is noted that while a particular telephony server is shown and described herein, the MIH client 705 may be implemented in any type of telephony server 705. The MIH client 705 is a new software module that may be introduced in the telephony application framework. Referring to FIG. 7, the MIH client 705 takes over the control of connection management if activated by user/network operations. The MIH client 705 contains all the intelligence and internal policies to make a handover decision. When the MIH client 705 takes control, the policy manager 710, device management module 715 and network server 720 may work as directed by the MIH client 705. During active calls, the device management module 715 communicates directly with the device drivers. The MIH client 705 may use the existing interfaces of the policy manager 710, phone server 725 and network server 720 to indicate the changes in the network connection. The addition of logic or processing is not required in the phone server 725 or the network server 720. The policy manager 710 may require some additional logic to handle a switch request. The call state is preserved across calls over different networks and transferred from one call processing module to another. The MIH client 705 may interface with the device drivers with one exception. For example, it will use the attention (AT) command interface 730 to interact with the cellular modem. In this example, the interface to the cellular modem is not based on function calls to the driver API, however the interfaces with the other wireless drivers will be based on function calls to the driver API. The MIH client 705 uses socket layer 735 and MIP/SIP interface 740 for MIH message transport and Layer 3 connectivity. These interfaces are mostly standardized. The MIH client 705 may be an independent code module, which is statically linked or dynamically linked to the application framework.

Referring to FIG. 7, the MIH client 705 may use various interfaces, namely the device interface (745), the telephony server device management interface (750), the MIH message transport interface (755), the network server interface (760), the MIP/SIP client interface (740), the policy manager interface (765), and the network management interface (767). As shown in FIG. 7, these interfaces are used to perform an inter-system handover, for example, from a WLAN to a cellular modem.

For example, using a device interface 745, the MIH client 705 interfaces with the device drivers through input output controls (IOCTLs). These interfaces to the device drivers may be used to start, stop a device, and obtain link level information, such as link status, etc. The only exception in the device interface 745 is the interface to the cellular modem. The MIH client 705 may use the existing AT command interface 730 to power on, power down, establish a radio link, and collect signal strength measurement, etc. from the cellular modem.

Using a telephony server device management interface 750, the MIH client 705 may use the existing interface of the device service provider and phone server 725 to inform the device whether the current network has been brought down and a new service is required to be started. For example, the phone server 725 may be instructed to use a new device service for all future telephony requests.

The MIH client 705 may use the socket layer to transport MIH messages, such as Events and Command service, and IS message, etc., using a MIH message transport interface 755.

The MIH client 705 may bring down a network connection and activate a new network connection using the network server interface 760, such as the startInterface or stopInterface. The network server then updates the new network information to the GUI widget. To start a new network connection, the network server loads the proper plugins and switches the socket to the new data link connection.

The MIH client 705 may use a MIP/SIP client interface 740 to reestablish Layer 3 connectivity. For example, if MIP is used, the MIH client 705 may trigger MIP binding update when a handover has been performed.

The MIH client 705 may instruct the call processing module to update its policy decision and switch to new call processing modules using a policy manager interface 765.

Referring to the example shown in FIG. 7, when the device is connected over a WLAN network, the MIH client 705 receives a link status from the WLAN driver 770 through the device interface 745 and a link status from the cellular modem through the AT command interface 730. As the link status starts degrading, the MIH client 705 decides to wake up the cellular modem.

The cellular modem may be brought up in IDLE mode to collect link measurements. When the cellular modem wakes up from a low power state, it camps to a cell and starts performing measurements. The link quality measurement is then sent to the MIH client 775.

When the MIH client 705 collects WLAN and cellular link quality reports, it sends them to the MIH server over the MIH message transport interface 755 using a socket layer. When the MIH server decides to perform a handover to a cellular modem, it sends the handover command to the MIH client 705.

When the MIH client 705 brings up the cellular modem in full power, the cellular modem registers with the network. The successful registration of the cellular modem is sent as a notification to the network management entity 780. The network management entity loads the appropriate plugin and establishes the Layer 2 connectivity. The MIH client 705 then sends a MIP binding update to reestablish Layer 3 connection. Finally, the WLAN driver is powered down to low power mode 740 using the device interface 745.

The following is an example of a WTRU configured to perform a handover from a WLAN to a cellular network. The telephony server 700 of the WTRU includes a MIH client 705, a WLAN device driver, a cellular device driver, call processing modules, a device management module, an attention (AT) command interface 730, a network management module, a socket layer, and an upper layer configured for Layer 3 protocols.

The WLAN driver sends a link status to the MIH client 705 through a WLAN-specific interface using IOCTLs. The cellular driver sends a link status to the MIH client 705 through a cellular-specific interface using AT commands. The MIH client 705 receives the link status from the WLAN driver and the cellular driver and triggers a handover in order to establish a new radio link. The MIH client 705 communicates with a socket layer through a MIH message transport interface 755 and establishes an IP and a point-to-point (PPP) connection using the network management interface 767. The MIH client 705 communicates with a network server through a network server interface 760 and reestablishes Layer 3 connectivity through a MIP/SIP interface. The MIH client 705 communicates with the call processing modules using a policy manager interface and completes the handover of the active MIP session to the cellular device driver using the AT command interface. The network management unit communicates with the MIH client 705 through a telephony server device interface to power down the WLAN device.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a first transceiver configured to communicate using a first radio access technology (RAT);
a second transceiver configured to communicate using a second RAT;
at least two radio interface layer (RIL) proxies configured to implement RIL application functions, wherein the at least two RIL proxies include a first RIL proxy and a second RIL proxy;
a RIL media independent handover (RIL MIH) client;
a first RIL driver configured to communicate with the first transceiver, to send radio link status indications related to the first transceiver to the RIL MIH client, and to communicate with the first RIL proxy during active communication at the first transceiver;
a RIL driver configured to communicate with the second transceiver, to send radio link status indications to the RIL MIH client, and to communicate directly with the second RIL proxy during active communication at the second transceiver; and
an upper layer protocol stack;
wherein the RIL MIH client is configured to:
receive radio link status indications from the first RIL driver and the second RIL driver;
initiate a radio level handover from the first transceiver to the second transceiver in order to establish a new radio link at the second transceiver;
initiate an internet protocol (IP) level handover in response to establishment of the new radio link; and
communicate to the at least two RIL proxies that the new radio link is ready for use in response to completion of the IP level handover.

2. The WTRU of claim 1, wherein the first RIL driver is one of a wireless broadband (WiBro) driver, a worldwide interoperability for microwave access (WiMAX) driver, a wideband code division multiple access (WCDMA) driver, a code division multiple access (CDMA2000) driver, a Long Term Evolution (LTE) driver, a wireless local area network (WLAN) driver, or a cellular driver.

3. The WTRU of claim 1, wherein the second RIL driver is one of a wireless broadband (WiBro) driver, a worldwide interoperability for microwave access (WiMAX) driver, a wideband code division multiple access (WCDMA) driver, a code division multiple access (CDMA2000) driver, a Long Term Evolution (LTE) driver, a wireless local area network (WLAN) driver, or a cellular driver.

4. The WTRU of claim 1, wherein the RIL MIH client is further configured to:
receive a handover request from an external server after sending the radio link status indications.

5. The WTRU of claim 1, wherein the RIL MIH client is configured to trigger a network-controlled mode radio level handover in response to a server request.

6. The WTRU of claim 1, wherein the RIL MIH client is configured to trigger an independent client-controlled mode radio level handover.

7. A wireless transmit/receive unit (WTRU) comprising:
a media independent handover (MIH) client;
a first transceiver of a first type of radio access technology (RAT), wherein the first RAT is a cellular RAT, and wherein the first transceiver includes a first device driver configured to send link status information to the MIH client;
a second transceiver of a second type of RAT including a second device driver configured to send link status information to the MIH client;
a call processing module;
a device management module configured to communicate with the call processing module, to communicate with the first transceiver during active communication at the first transceiver, and to communicate with the second transceiver during active communication at the second transceiver;
a network management module configured to communicate with the MIH client and the first and second transceivers;
a layer 3 protocol module including a mobile internet protocol (MIP) and a session initiation protocol (SIP) configured to communicate with the network management module, the MIH client and a socket layer; and
an AT command interface configured to communicate with the first transceiver and the device management module;
wherein the link status information sent by the first device driver to the MIH client is sent via the AT command interface; and
wherein the MIH client is configured to:
trigger a radio level handover in order to establish a new radio link,
wherein the radio level handover is from the first transceiver to the second transceiver or from the second transceiver to the first transceiver;
establish an internet protocol (IP) and a point-to-point (PPP) connection using the new radio link;
initiate a handover of an active MIP session; and
communicate to the call processing module that the new radio link is ready for use in response to a completion of the handover of the active MIP session.

8. The WTRU of claim 7, wherein the second device driver is one of a wireless local area network (WLAN) driver, an ethernet driver, a serial driver, a dialup modem driver or a cellular modem driver.

9. The WTRU of claim 7, wherein the MIH client is further configured to establish an internet protocol (IP) and a point-to-point (PPP) connection using the new radio link by sending a request to the network server module, and the network server module is further configured to establish the IP and PPP connections in response to receiving the request.

10. The WTRU of claim 7, wherein the MIH client is further configured to:
notify a device whether a new service is required using a currently active device interface and a phone server.

11. The WTRU of claim 7 further comprising a network server interface configured to bring down a network connection.

12. The WTRU of claim 7 further comprising a network server interface configured to activate a new network connection.

13. The WTRU of claim 7, wherein the MIH client is configured to instruct the call processing module to update a policy decision and switch to a new call processing module.

14. The WTRU of claim 7, wherein the MIH client is configured to trigger the radio level handover based on the received link status information from either the first transceiver or the second transceiver.

15. The WTRU of claim 7, wherein the MIH client is configured to trigger the radio level handover based on information received from an MIH server.

16. A method for use in a wireless transmit/receive unit (WTRU), wherein the WTRU includes
- a first transceiver configured to communicate using a first radio access technology (RAT),
- a second transceiver configured to communicate using a second RAT,
- at least two radio interface layer (RIL) proxies configured to implement RIL application functions, wherein the at least two RIL proxies include a first RIL proxy and a second RIL proxy,
- a RIL media independent handover (RIL MIH) client,
- a first RIL driver configured to communicate with the first transceiver and the first RIL proxy,
- a second RIL driver configured to communicate with the second transceiver and the second RIL proxy, the method comprising:
- the RIL MIH client receiving radio link status indications from the first RIL driver and the second RIL driver;
- the RIL MIH client initiating a radio level handover in order to establish a new radio link;
- the RIL MIH client initiating an internet protocol (IP) level handover in response to establishment of the new radio link; and
- the RIL MIH client communicating to the at least two RIL proxies that the new radio link is ready for use in response to completion of the IP level handover.

* * * * *